United States Patent
Federici et al.

(10) Patent No.: US 8,962,533 B2
(45) Date of Patent: Feb. 24, 2015

(54) METHOD FOR REDUCING FILTRATE LOSS FROM OIL BASED DRILLING FLUIDS

(75) Inventors: Franco Federici, Busto Arsizio (IT); Thierry Bossi, Orino (IT); Christian Parisi, Milan (IT); Luigi Merli, Saronno (IT); Daniele Moro, Samarate (IT); Pierangelo Pirovano, Comerio (IT); Giuseppe Li Bassi, Gavirate (IT)

(73) Assignee: Lamberti SpA, Albizzate(VA) (IT)

( * ) Notice: Subject to any disclaimer, the term of this patent is extended or adjusted under 35 U.S.C. 154(b) by 802 days.

(21) Appl. No.: 13/145,893

(22) PCT Filed: Jan. 20, 2010

(86) PCT No.: PCT/EP2010/050652
§ 371 (c)(1), (2), (4) Date: Jul. 22, 2011

(87) PCT Pub. No.: WO2010/084137
PCT Pub. Date: Jul. 29, 2010

(65) Prior Publication Data
US 2011/0281778 A1 Nov. 17, 2011

(30) Foreign Application Priority Data
Jan. 23, 2009 (IT) .................................. VA09A0007

(51) Int. Cl.
*C09K 8/12* (2006.01)
*C09K 8/508* (2006.01)
*C09K 8/32* (2006.01)

(52) U.S. Cl.
CPC ................. *C09K 8/5083* (2013.01); *C09K 8/32* (2013.01)
USPC ......................................................... 507/119

(58) Field of Classification Search
CPC ........................................................ C09K 8/12
See application file for complete search history.

(56) References Cited

U.S. PATENT DOCUMENTS

| | | | |
|---|---|---|---|
| 2,805,990 A | 9/1957 | Bergman | |
| 2,961,420 A * | 11/1960 | Frey, Jr. et al. | 524/798 |
| 3,738,934 A * | 6/1973 | Browning | 507/107 |
| 5,789,349 A * | 8/1998 | Patel | 507/121 |
| 7,271,131 B2 | 9/2007 | Halliday et al. | |

FOREIGN PATENT DOCUMENTS

GB 2131067 A 6/1984

* cited by examiner

*Primary Examiner* — Randy Gulakowski
*Assistant Examiner* — Jeffrey Washville
(74) *Attorney, Agent, or Firm* — Mossman, Kumar & Tyler

(57) ABSTRACT

A method for reducing filtrate loss of oil based drilling fluids comprising the following steps: a) preparing by emulsion polymerization an aqueous dispersion containing: i) from 20% to 60% by weight of a copolymer comprising from 60% to 90% by weight of styrene and/or vinyltoluene monomers, from 7 to 40% by weight of 2-ethylhexyl acrylate monomers and from 0.01 to 3% of polyfunctional unsaturated monomers; ii) from 40 to 80% by weight of water; iii) from 0.1% to 5% by weight of at least one surfactant; b) providing an oil based drilling fluid containing the aqueous dispersion obtained from step a), or its copolymer in powder form; c) injecting and circulating the drilling fluid in the borehole.

8 Claims, No Drawings

METHOD FOR REDUCING FILTRATE LOSS FROM OIL BASED DRILLING FLUIDS

FIELD OF THE INVENTION

The present invention relates to a method for reducing filtrate loss in drilling fluids employed in the drilling and completion of oil and gas wells. The present invention particularly relates to a method for reducing filtrate loss of oil based drilling fluids, and to filtrate reducers for oil based drilling fluids which are liquid or in powder form.

BACKGROUND OF THE ART

Drilling fluids, which are also called drilling muds, are complex mixtures of chemicals used in drilling operations for the production of hydrocarbons and natural gas from subterranean reservoirs. Typically, oil and gas wells are drilled using drilling equipment in the presence of a drilling fluid.

Drilling fluids, generally comprising a liquid or a solid suspension in a dispersing liquid phase, are pumped inside the drilling shaft and exit from the drilling bit through small openings. The drilling fluids return to the surface through the small annulus between the outside of the drilling shaft and the bore hole wall.

Drilling fluids perform a number of functions. Exemplary of these functions are carrying drill cuttings up to the surface and suspending them when the fluid circulation is stopped; cooling and lubricating the drill bit; creating hydrostatic pressure to avoid uncontrolled blow outs and to help supporting the weight of the bore hole walls; and acting as lubricant between the drilling bit and the bore hole walls.

Drilling fluids, moreover, create on the bore hole walls and eventually on the surface of porous geological formations a filter cake having low permeability. The liquid permeating the filter cake and the formation is called "filtrate".

If the amount of filtrate passing into the formation (filtrate loss) is high, the composition of the drilling fluid itself changes, and this causes loosing control of fluid properties. At the same time, a large fluid loss can cause the deposition of a thick filter cake on the bore hole walls that reduces the diameter of the well bore.

For all these reasons, it is generally desirable that the drilling fluid exhibits a low level of filtrate loss. It is especially desirable that the drilling fluid exhibits a low level of filtrate loss while having specific rheological characteristics of viscosity, plasticity and thixotropy to promote the removal and carrying away of drill cuttings.

Drilling fluids may be classified according to their liquid base.

Oil based fluids comprise solid particles suspended in an oil continuous phase and, possibly, water or brine emulsified with the oil.

Alternatively, water based fluids contain solid particles suspended in a continuous aqueous phase.

Many filtrate reducers for use in oil based drilling fluids have been described, including high molecular weight oil soluble or oil swellable polymers, such as rubber, polybutadiene, polyisoprene, ethylene-propylene copolymers, vinyltoluene-acrylate esters copolymers.

These filtrate reducers are said to minimize the liquid loss through the formation and to inhibit the porosity of the filter cake.

According to a large part of the patent literature, the identity and quantity of monomers in the polymeric filtrate reducers for use in oil based drilling fluids is not too critical.

By way of example:

U.S. Pat. No. 2,805,990 describes drilling fluids having a reduced fluid loss incorporating a latex of polymers of conjugated dienes containing 4 to 6 carbon atoms per molecule, including styrene, 1,3-butadiene, chloroprene, isoprene, methyl pentadiene, 2,3 dimethyl 1-3 butadiene, alpha methyl styrene and halogenated styrene, the polymers being homopolymers or copolymers including terpolymers;

the preferred filtrate reducers of GB 2 131 067 are 100% hydrocarbon polymers and these may be homopolymers or copolymers, even though the hydrocarbon polymers may contain minor proportions of other copolymerisable monomers, such as copolymerisable acids, like acrylic, methacrylic, itaconic or fumaric acids, or amides such as acrylamide, or copolymerisable non-hydrocarbon monomers such as acrylate or methacrylate esters or acrylonitrile;

the oil based drilling fluid of U.S. Pat. No. 7,271,131 comprises a polymer latex capable of providing a deformable latex film on at least one portion of a subterranean formation, the latex comprising polymer particles in an aqueous continuous phase, where the polymer particles are selected from the group consisting of polymethyl methacrylate, polyethylene, carboxylated styrene/butadiene copolymers, polyvinylacetate copolymers, polyvinyl acetate/vinyl chloride/ethylene copolymers, polyvinyl acetate/ethylene copolymers, natural latexes, polyisoprene, polydimethylsiloxane, and mixtures thereof.

U.S. Pat. No. 3,738,934 describes oil based drilling fluids formed by dispersing particles of oil and water insoluble vinyl toluene-acrylate copolymers which are obtained by reacting (a) vinyl toluene, with (b) an acrylate moiety, selected from the group consisting of methyl, ethyl, 2-ethylhexyl, butyl, dodecyl (meth)acrylates.

In this document, the identity of at least one of the monomers (vinyl toluene) is specified, and the acrylate-to-vinyl toluene ratio (at least 1.65 to 1.00 by weight) is defined; moreover, it is reported that when the product contains a lesser amount of acrylate, the desired swelling does not occur in the water in oil emulsion (oil based fluid).

It has now been found that by co-polymerizing in emulsion 2-ethylhexyl acrylate, styrene and/or vinyl toluene with minor amounts of a polyfunctional unsaturated monomer in specific ratios and conditions, a very effective filtrate reducer for oil based drilling fluids is obtained.

Surprisingly, the presence of a polyfunctional unsaturated monomer and of at least 7% by weight of 2-ethylhexyl acrylate gives a copolymer which is an effective filtrate reducer for use in oil based fluids even when the polymer itself comprises 60% or more of styrene monomer units.

SUMMARY OF THE INVENTION

In one embodiment, the present invention is a method for reducing filtrate loss of oil based drilling fluids characterized by:

a) preparing by emulsion polymerization an aqueous dispersion containing: i) from 20% to 60% by weight of a copolymer comprising from 60% to 90% by weight of styrene and/or vinyltoluene monomers, from 7 to 40% by weight of 2-ethylhexyl acrylate monomers and from 0.01 to 3% of polyfunctional unsaturated monomers; ii) from 40 to 80% by weight of water; iii) from 0.1% to 5% by weight of at least one surfactant;

b) providing an oil based drilling fluid containing the aqueous dispersion obtained from step a) or its copolymer in powder form;
c) injecting and circulating the drilling fluid in the borehole.

In another embodiment, the invention is an aqueous dispersion, useful as liquid filtrate reducer for oil based drilling fluids, containing: i) from 20% to 60% by weight of a copolymer comprising from 60% to 90% by weight of styrene and/or vinyltoluene monomers, from 7 to 40% by weight of 2-ethylhexyl acrylate monomers and from 0.01 to 3% of polyfunctional unsaturated monomers; ii) from 40 to 80% of water; iii) from 0.1% to 5% by weight of at least one surfactant.

In another embodiment, the invention is a filtrate reducer in powder form, useful for oil based drilling fluids, containing: I) from 80 to 99.8% by weight of a copolymer comprising from 60% to 90% by weight of styrene and/or vinyltoluene monomers, from 7 to 40% by weight of 2-ethylhexyl acrylate monomers and from 0.01 to 3% of polyfunctional unsaturated monomers; II) from 0.2% to 20% by weight of at least one surfactant.

In still other embodiments, the present invention is an oil based drilling fluid containing from 0.5 to 50 $Kg/m^3$ of the above aqueous dispersion or containing from 0.1 to 30 $Kg/m^3$ of the above described filtrate reducer in powder form.

DETAILED DESCRIPTION OF THE INVENTION

Preferably, the copolymer comprises from 65% to 85% by weight of styrene and/or vinyltoluene monomers, more preferably of styrene monomers, from 13 to 35% by weight of 2-ethylhexyl acrylate monomers and from 0.1 to 2 of polyfunctional unsaturated monomers.

According to the most preferred embodiment in the copolymer the balance of styrene monomer, 2-ethylhexyl acrylate monomer and polyfunctional unsaturated monomer is 100%.

The polyfunctional unsaturated monomer is any monomer containing at least two un-conjugated reactive carbon-carbon double bonds which are able to react with styrene, vinyl toluene and 2-ethylhexyl acrylate in a radically initiated polymerization.

Bifunctional monomers containing two allylic or acrylic carbon-carbon double bonds in terminal position are preferred.

Examples of useful polyfunctional unsaturated monomer are methylenebisacrylamide, allylmethacrylate, diallylmaleate, triallylamine, pentaerythrityl triallyl ether, N,N'-divinylethyleneurea; allyl ethers, comprising at least two allyl groups, or vinyl ethers, having at least two vinyl groups, of polyhydric alcohols (such as, for example, sorbitol, 1,2-ethanediol, 1,4-butanediol, trimethylolpropane, glycerol, diethylene glycol) and of sugars (such as sucrose, glucose or mannose); dihydric alcohols completely esterified with acrylic acid or methacrylic acid and having 2 to 4 carbon atoms (such as ethylene glycol dimethacrylate, ethylene glycol diacrylate, butanediol dimethacrylate, butanediol diacrylate, diacrylates or dimethacrylates of polyethylene glycols having molecular weights from 300 to 600), ethoxylated trimethylolpropane triacrylates or ethoxylated trimethylolpropane trimethacrylates, 2,2-bis(hydroxymethyl)butanol trimethacrylate, pentaerythrityl triacrylate, pentaerythrityl tetraacrylate); triallylmethylammonium chloride; and mixture thereof.

The aqueous dispersions described above are prepared by radical emulsion polymerization of the monomers in the presence of at least a surfactant, which can be of the anionic, nonionic, cationic or amphoteric kind.

A batch or semi-batch emulsion polymerization process may be used.

Best results in terms of filtrate control have been obtained with aqueous dispersions which were prepared by semi-batch emulsion polymerization in the presence of an anionic surfactant, such as sodium lauryl sulfate.

The initiator of radical emulsion polymerization is chosen among the normally utilized initiators such as ammonium persulfate, sodium persulfate, potassium persulfate, benzoyl peroxide, lauryl peroxide, azodiisobutyronitrile, redox couples such as t-butyl hydroperoxide and sodium metabisulfite.

The procedure for the preparation of the aqueous dispersion of the invention is particularly advantageous because it does not produce any liquid or solid waste and the resulting aqueous dispersions can be used as they are obtained in the oil based drilling fluids, showing excellent filtrate control performances without any need of washing or purification.

Alternatively, the water contained in the aqueous dispersion may be removed to recover a filtrate reducer for oil based drilling fluids in powder form; also the thus obtained filtrate reducer can be used without further purification, because the surfactant which is contained therein does not adversely affect the filtrate control performances of the copolymer.

According to a preferred embodiment, the invention is a filtrate reducer in powder form, useful for oil based drilling fluids, containing: I) from 80 to 99.8% by weight of a copolymer comprising from 65% to 85% by weight of styrene and/or vinyltoluene monomers, more preferably of styrene monomers, from 13 to 35% by weight of 2-ethylhexyl acrylate monomers and from 0.1 to 2% of polyfunctional unsaturated monomers; II) from 0.2 to 20% by weight and more of at least one surfactant.

More preferably the filtrate reducer in powder form contains from 95 to 99.5% by weight of copolymer I) and from 0.5 to 5% by weight of surfactant II).

According to the most preferred embodiment the filtrate reducer in powder form consists of I) and II) and the copolymer comprises from 65% to 85% by weight of styrene, from 13 to 35% by weight of 2-ethylhexyl acrylate monomers and from
0.1 to 2% of polyfunctional unsaturated monomers.

The oil based drilling fluids containing the aqueous dispersion or the filtrate reducer in powder form are prepared by adding them in the oil that will be used to prepare the fluid or directly in the fluid.

Although both the aqueous dispersion and the filtrate reducer in powder form contain at least one surfactant, and even though the oil based drilling fluids usually contain emulsifiers, it may be necessary to use one or more additional oil soluble emulsifiers to properly disperse the aqueous dispersion in the drilling fluid. These emulsifiers may be added to the aqueous dispersion, to the oil or to the drilling fluid.

Dispersion in the oil or in the drilling fluid is performed by mechanically mixing the aqueous dispersion or the filtrate reducer in powder form with the oily system, preferably until homogeneity is reached.

Preferably the oil based drilling fluid contains from 1 to 3 $Kg/m^3$ of the above aqueous dispersion or from 0.2 to 1.8 $Kg/m^3$ of the above described filtrate reducer in powder form.

The method for reducing filtrate loss can be used in oil based drilling fluids containing any kind of oil currently known to those skilled in the art.

The oil may be from a natural or synthetic source.

Examples of suitable oil phase include, without limitation, diesel oils, crude oils, paraffin oils, mineral oils, low toxicity mineral oils, olefins, esters, amides, amines, synthetic oils such as polyolefins, polydiorganosiloxanes, siloxanes, organosiloxanes and combinations thereof, ethers, acetals, dialkylcarbonates, hydrocarbons and combinations thereof.

The preferred oil phases are paraffin oils, low toxicity mineral oils, diesel oils, mineral oils, polyolefins, olefins and mixtures thereof.

Factors determining which oil phase will be used in a particular application, include but are not limited to, the cost and performance characteristics, environmental compatibility and availability.

The oil based drilling fluids of the present invention preferably also comprise an aqueous phase that is at least partially immiscible in the oil phase.

Suitable examples of aqueous phase include, without limitation, fresh water, sea water, salt water, brines (e.g. saturated salt waters) and water comprising glycerine, glycols, polyglycol amines, polyols, or derivatives thereof that are partially immiscible in the oleaginous fluid, and combinations thereof.

Suitable brines may include heavy brines. Heavy brines, for the purposes of this application, include brines that may be used to weight up a fluid, such as a treatment fluid, instead of using traditional weighting agents.

Brines generally comprise water soluble salts.

Suitable water soluble salts are sodium chloride, calcium chloride, calcium bromide, zinc bromide, sodium formate, potassium formate, sodium acetate, potassium acetate, calcium acetate, ammonium acetate, ammonium chloride, ammonium bromide, sodium nitrate, potassium nitrate, ammonium nitrate, calcium nitrate, sodium carbonate, potassium carbonate, and combinations thereof.

The aqueous phase is chosen taking into account several factors including cost, environmental and health safety profile, density, availability, and which oil phase has been chosen. For example, if the application needs an emulsion with a heavy weight, a zinc bromide brine may be chosen.

The oil based drilling fluids of the invention may further comprise conventional additives including weighting agents, wetting agents, thickeners, thinning agents, lubricants, antioxidants, corrosion inhibitors, scale inhibitors, defoamers, biocides, pH modifiers, and the like.

Such fluids, in particular, may also contain other filtrate reducers, such as gilsonite, organophilic lignite, organophilic tannins, synthetic polymers, polycarboxylic fatty acids.

When used in certain applications, the fluids may include particulates such as proppant or gravel.

EXAMPLES

Example 1

Comparative

Preparation of a filtrate reducer in the form of aqueous dispersion containing a vinyl toluene/2-ethylhexyl acrylate copolymer.

In a 1000 ml reactor, equipped with stirrer, thermometer, N2 inlet, heating and cooling device, 452.8 g of water, 13.8 g of ethoxylated isotridecyl alcohol, 50 g of 2-ethylhexyl acrylate and 150 g of vinyltoluene are charged.

The temperature is regulated at 30° C.

2.0 g of a 10% wt ammonium persulfate aqueous solution and 2.0 g of a 10% wt sodium hydrosulfite aqueous solution are charged.

Because of the exothermic reaction, the temperature raises in about 1 hour to 50° C. The reaction mixture is heated to 60° C. and maintained for 1 hour.

0.8 g of t-butyl hydroperoxide and 0.4 g of ascorbic acid dissolved in 2.0 g of water are added. The temperature is maintained for 30 min.

The reaction mixture is cooled down and discharged.

The obtained filtrate reducer has Brookfield® viscosity (20 rpm) of 6 mPa·s, dry matter content 31.74% and pH 2.76.

Example 2

Preparation of a filtrate reducer in the form of aqueous dispersion containing a vinyltoluene/2-ethylhexyl acrylate/methylenebisacrylamide copolymer.

The aqueous dispersion was prepared as the aqueous dispersion of Example 1, but charging 1 g of methylenebisacrylamide along with vinyltoluene and 2-ethylhexyl acrylate.

Example 3

Preparation in semi-batch of a filtrate reducer in the form of aqueous dispersion containing the copolymer of Example 2.

In a 1000 ml reactor, equipped with stirrer, thermometer, N2 inlet, heating and cooling device, 307.8 g of water and 15 g of sodium lauryl sulfate are charged and heated to 85° C. In a 1 liter bottle a pre-emulsion is prepared with: 128.4 g of water, 33 g of sodium lauryl sulfate, 75 g of 2-ethylhexylacrylate, 225 g of vinyltoluene and 1.5 g of methylenebisacrylamide.

30 g of the pre-emulsion are transferred to the reactor and 0.24 g of ammonium persulfate dissolved in 6 g of water are added.

Because of the exothermic reaction, the temperature raises to 88.5° C. in 3 minutes.

At the end of exothermy, the remaining part of the pre-emulsion and of 1.5 g of ammonium persulfate in 58.5 g of water are added in about 2 hours.

The reaction mixture is left under stirring for 30 min. and then cooled to 65°. 1.32 g of 70% t-butyl hydroperoxide and 0.66 g of ascorbic acid in 3 g of water are added.

The reaction mixture is cooled down and discharged.

The obtained filtrate reducer has Brookfield® viscosity (20 rpm) of 16 mPa·s, dry matter content 36.37% and pH 2.34.

Example 4

Preparation of a filtrate reducer in powder form from the aqueous dispersion of Example 3.

The filtrate reducer was prepared as in Example 3 and dried in oven.

Example 5

Preparation of a filtrate reducer in the form of aqueous dispersion containing a vinyltoluene/2-ethylhexyl acrylate/methylenebisacrylamide copolymer.

The filtrate reducer was prepared as in Example 3, but charging 3 g of methylenebisacrylamide.

Example 6

Preparation of a filtrate reducer in the form of aqueous dispersion containing a styrene/2-ethylhexyl acrylate/methylenebisacrylamide copolymer.

The filtrate reducer was prepared as the aqueous dispersion of Example 5, but charging 225 g of styrene instead of 225 g of vinyltoluene.

Example 7

Comparative

The filtrate reducer was prepared as in Example 6, but charging 150 g of styrene and 150 g of 2-ethylhexyl acrylate instead of 225 g of styrene and 75 g of 2-ethyl hexyl acrylate.

Example 8

The filtrate reducer was prepared as in Example 6, but charging 240 g of styrene and 60 g of 2-ethylhexyl acrylate instead of 225 g of styrene and 75 g of 2-ethylhexyl acrylate.

Example 9

Comparative

Preparation of a filtrate reducer in the form of aqueous dispersion containing a styrene/butyl acrylate/methylenebisacrylamide copolymer.

The filtrate reducer was prepared as in Example 6, but charging 75 g of butyl acrylate instead of 75 g of 2-ethylhexyl acrylate.

Example 10

Comparative

Preparation of a filtrate reducer in the form of aqueous dispersion containing a styrene/ethyl acrylate/methylenebisacrylamide copolymer.

The filtrate reducer was prepared as in Example 6, but charging 75 g of ethyl acrylate instead of 75 g of 2-ethylhexyl acrylate.

Example 11

Preparation of a filtrate reducer in powder form from the aqueous dispersion of Example 8.

The filtrate reducer was prepared as in Example 8 and dried in oven.

Filtrate Loss Test

In order to evaluate the filtrate loss reduction performance of the filtrate reducers of the Examples the test described here below was carried out according to API RP 13-2B section 7.2 and 7.3, IV edition, February 2005.

A suspension simulating a drilling fluid is prepared as per the formulation reported in Table 1 by means of a Hamilton Beach, by adding in sequence the ingredients.

TABLE 1

| Ingredients | Dosage (Kg/m$^3$) | Mixing time |
|---|---|---|
| Mineral oil (b.p. 230-270° C.) | 423.5 | |
| Organoclay | 17.1 | 5 min |
| Lime | 28.6 | 5 min |
| Polyamide based emulsifier | 25.7 | 5 min |
| Wetting agent | 5.7 | 5 min |
| CaCl$_2$ brine | 126.5 | 10 min |
| Barite | 1268.6 | 15 min |
| Filtrate reducers from Examples 1-11 | 4.6* | 10 min |

*dry matter

The mixture is stirred 20 minutes more. The obtained suspension is placed in a hot rolling cell. The cell is sealed and rolled for 16 hours in a pre-heated oven at 193° C. This treatment simulates the thermal stress applied to the fluid during the recycling in the well.

After the rolling period is completed, the cell is removed from the oven and cooled to room temperature in a cold water-bath. The cell is opened, the suspension poured into a filter press cell and the filtrate volume is determined after 30 min at 176.7° C. and 500 psi. The filtrate loss volume (referred to as FLc in the following tables) is expressed in milliliters. A lower value for FLc indicates better performance of the Filtrate Reducer as compared to a higher value.

The filtrate loss volumes ($FL_c$) obtained with the filtrate reducers of the Examples 1 to 11 are reported in Table 2, together with the copolymer chemical compositions, the polymerization method and the physical form of the filtrate reducer.

TABLE 2

Measurement of the Filtrate Loss with filtrate reducers from Examples 1-11

| Example | B/SB | AD/P | Copolymer chemical composition* | | | | | | $FL_C$ (ml) |
| | | | VT | ST | EHA | BA | EA | MBA | |
|---|---|---|---|---|---|---|---|---|---|
| 1** | B | AD | 75 | — | 25 | — | — | — | 84 |
| 2 | B | AD | 75 | — | 25 | — | — | 0.5 | 12 |
| 3 | SB | AD | 75 | — | 25 | — | — | 0.5 | 11.2 |
| 4 | SB | P | 75 | — | 25 | — | — | 0.5 | 11.2 |
| 5 | SB | AD | 75 | — | 25 | — | — | 1.0 | 10.4 |
| 6 | SB | AD | — | 75 | 25 | — | — | 1.0 | 9.6 |
| 7** | SB | AD | — | 50 | 50 | — | — | 1.0 | 16 |
| 8 | SB | AD | — | 80 | 20 | — | — | 1.0 | 9.2 |
| 9** | SB | AD | — | 75 | — | 25 | — | 1.0 | nc |
| 10** | SB | AD | — | 75 | — | — | 25 | 1.0 | nc |
| 11 | SB | P | — | 80 | 20 | — | — | 1.0 | 9.2 |

*Monomers parts by weight
**Comparative
B = batch polymerization
SB = semi-batch polymerization
AD = aqueous dispersion
P = powder
VT = vinyltoluene
EHA = 2-ethylhexyl acrylate
ST = styrene
MBA = methylenebisacrylamide
BA = butyl acrylate
EA = ethyl acrylate
Nc = no control, i.e. all the fluid is lost in few minutes of filtration

The invention claimed is:

1. A method for reducing filtrate loss of oil based drilling fluids comprising the following steps:
    a) preparing by emulsion polymerization an aqueous dispersion containing:
        i) from 20% to 60% by weight of a copolymer comprising from 65% to 85% by weight of styrene monomers, from 13% to 35% by weight of 2-ethylhexyl acrylate monomers and from 0.1% to 2% of polyfunctional unsaturated monomers;
        ii) from 40 to 80% by weight of water; and
        iii) from 0.1% to 5% by weight of at least one surfactant;
    b) providing an oil based drilling fluid containing the aqueous dispersion obtained from step a), or its copolymer in powder form; and
    c) injecting and circulating the drilling fluid in the borehole.

2. The method according to claim 1, wherein the balance of styrene monomers, 2-ethylhexyl acrylate monomers and polyfunctional unsaturated monomers is 100%.

3. A filtrate reducer for oil based drilling fluids in the form of an aqueous dispersion containing: i) from 20% to 60% by weight of a copolymer comprising from 65% to 85% by weight of styrene monomers, from 13% to 35% by weight of 2-ethylhexyl acrylate monomers and from 0.1% to 2% of polyfunctional unsaturated monomers; ii) from 40 to 80% by weight of water; and iii) from 0.1% to 5% by weight of at least one surfactant.

4. The filtrate reducer according to claim 3, wherein the balance of styrene monomers, 2-ethylhexyl acrylate monomers and polyfunctional unsaturated monomers is 100%.

5. A filtrate reducer in powder form for oil based drilling fluids containing: I) from 80 to 99.8% by weight of a copolymer comprising from 65% to 85% by weight of styrene monomers, from 13% to 35% by weight of 2-ethylhexyl acrylate monomers and from 0.1% to 2% of polyfunctional unsaturated monomers; and II) from 0.2% to 20% by weight of at least one surfactant.

6. The filtrate reducer according to claim 5 wherein in the copolymer the balance of styrene monomers, 2-ethylhexyl acrylate monomers and polyfunctional unsaturated monomers is 100%.

7. An oil based drilling fluid comprising from 0.1 to 30 Kg/m3 of a filtrate reducer in powder form for oil based drilling fluids containing: I) from 80 to 99.8% by weight of a copolymer comprising from 65% to 85% by weight of styrene monomers, from 13% to 35% by weight of 2-ethylhexyl acrylate monomers and from 0.1% to 2% of polyfunctional unsaturated monomers; and II) from 0.2% to 20% by weight of at least one surfactant.

8. The oil based drilling fluid according to claim 7 wherein in the copolymer the balance of styrene monomers, 2-ethylhexyl acrylate monomers and polyfunctional unsaturated monomers is 100%.

* * * * *